United States Patent Office 3,375,869
Patented Apr. 2, 1968

3,375,869
METHOD OF CEMENTING CASING IN A WELL
Joseph U. Messenger, Dallas, Tex., assignor to Mobil Oil Corporation, a corporation of New York
No Drawing. Filed Oct. 22, 1965, Ser. No. 502,311
13 Claims. (Cl. 166—3)

ABSTRACT OF THE DISCLOSURE

This specification discloses a method of cementing a casing in a well penetrating a subterranean formation which contains alkaline earth metal ions such as are present in aqueous solutions of calcium chloride, magnesium chloride, and magnesium sulfate. The aqueous formation liquid is analyzed to determine the concentration of ions of one or more of the above or other alkaline earth metals which will form a precipitate in the formation when contacted by filtrate from a cement slurry. The casing is cemented utilizing a cement slurry which is mixed such that the concentration of the alkaline earth metal ions in the aqueous filtrate from the slurry is at least as great as the concentration of the alkaline earth metal ions in the aqueous formation liquid. Thus, precipitates such as calcium hydroxide will be formed in the slurry where they will tend to be trapped such that they will not penetrate into the formation during the cementing procedure.

---

This invention relates to cementing casing in a well penetrating subterranean formations.

For various purposes, wells are drilled from the surface of the earth to subterranean formations. Thus, for example, wells are drilled to subterranean formations to produce and recover fluids such as water, gas, or oil from the formations.

In order to prevent entry into the well of a fluid from a formation other than the desired productive formation after the well has been completed, the well is provided with a casing extending from the surface to at least the desired productive formation. The casing is cemented in place. The cementing is effected by pumping a cement slurry, upward from the bottom of the casing where possible, through the annulus between the outer surface of the casing and the wall of the well. The cement thus forms an impermeable sheath bonding the casing to the productive formation, as well as other formations. After the cement has set, the casing and the cement sheath in the annulus are perforated to the productive formation. Thus, fluid can pass from the desired productive formation into the casing, but fluid from other formations cannot pass into the casing.

In this cementing operation, there is a loss of filtrate from the cement into the formations thereabout during the time required for placing the cement and for the cement to set. The filtrate is generally saturated with one or more alkaline earth metal hydroxides such as calcium hydroxide or magnesium hydroxide. Further, from special cement slurries the filtrate may also be saturated with one or more alkaline earth metal salts such as calcium sulfate. The filtrate often causes a reduction in permeability of the formation by precipitation of solids and by clay swelling.

The precipitation of hydroxides of calcium and of magnesium, as explained hereinafter, is particularly troublesome. The reactions of a filtrate saturated with calcium hydroxide illustrate how the reduction in permeability by precipitation is effected. When the filtrate, saturated with the sparingly soluble calcium hydroxide, contacts, in the formation, native aqueous liquids which contain relatively higher concentrations of highly soluble calcium chloride or magnesium chloride, precipitates of calcium hydroxide or magnesium hydroxide are formed. These precipitates restrict the permeability of the productive formation in the immediate vicinity of the well.

Clay swelling or dispersion of clay particles occurs when the filtrate is less strongly electrolytic than the aqueous liquid in the subterranean formation. The clay swelling caused by the filtrate invasion also effects a reduction in permeability in the immediate vicinity of the well.

In the immediate vicinity of the well, the effect of restrictions on permeability is magnified because the volume rate of flow per unit of cross-sectional area perpendicular to the general direction of flow is greater there than elsewhere in the formation. The reason why the volume rate of flow per unit of cross-sectional area is greater is twofold. First, since the fluid flowing from the formation converges into the well, the quantity of oil flowing through and from a unit volume of pore space within the formation increases as the distance from the well decreases. Second, the cross-sectional area perpendicular to flow decreases as the distance from the well decreases.

The precipitation and clay swelling, and attendant loss in permeability, are particularly undesirable in formations which initially have low permeabilities.

A portion of the permeability which is lost may be restored by subsequent, relatively expensive operations such as fracturing or acidizing. Such operations, however, often do not completely restore the permeability. Further, such operations may create other damage such as opening permeability channels into formation aquifers.

Accordingly, it is an object of this invention to provide a method of cementing casing in a well penetrating subterranean formations without damaging, or without restricting the permeability of, the subterranean formation from which it is desired to produce a fluid.

It is a particular object of this invention to provide a method of cementing casing in a well penetrating subterranean formations without forming an alkaline earth metal precipitate therein.

Further objects and attendant advantages of this invention will be apparent from the following description.

In accordance with the invention, casing is cemented in a well penetrating subterranean formations, including a productive subterranean formation containing an aqueous liquid, by the following multistep method. The first step is to sample the aqueous liquid in the productive formation and to determine the concentration of those alkaline earth metal ions which will form a precipitate in the formation when contacted by filtrate from a cement slurry prepared by using water free of these ions. The next step is to mix the cement slurry such that the concentration of the alkaline earth metal ions in the aqueous filtrate from the slurry is at least as great as the concentration of the alkaline earth metal ions in the aqueous liquid in the formation. The third and final step is to place the cement slurry in the well between the casing and the wall of the well and allow it to set. In this manner, a substantially impermeable sheath of set cement bonds the casing to the wall of the well without forming an alkaline earth metal precipitate out in the formation.

As previously indicated, the alkaline earth metal ions of most nearly universal concern are the calcium ions, but the concentration of magnesium ions must also be determined when they are present since they react with the cement filtrate to form sparingly soluble precipitates of magnesium hydroxide. Other alkaline earth metal ions such as the ions of barium, beryllium, strontium, or radium are not of widespread use in cement slurries nor do they occur freely in the aqueous liquids in subterranean formations. Hence, only infrequently will there be need for analyzing for these other alkaline earth metal ions in the aqueous liquids from the productive formations.

The saturation concentrations of typical compounds of calcium and magnesium in parts per million parts of water (p.p.m.) at various temperatures are shown in the following Table of Solubilities.

TABLE OF SOLUBILITIES

| $CaCl_2$ (in p.p.m.) | $Ca(OH)_2$ (in p.p.m.) | $CaSO_4$ (in p.p.m.) |
|---|---|---|
| 595,000 at 0° C. | 1,850 at 0° C. | 2,980 at 20° C. |
| 1,590,000 at 100° C. | 770 at 100° C. | 1,619 at 100° C. |

| $MgCl_2$ (in p.p.m.) | $Mg(OH)_2$ (in p.p.m.) | $MgSO_4$ (in p.p.m.) |
|---|---|---|
| 353,000 at 20° C. | 9 at 18° C. | 260,000 at 0° C. |
| 422,000 at 100° C. | 40 at 100° C. | 738,000 at 100° C. |

The Table of Solubilities illustrates quantitatively the previously noted disparity in solubility between the highly soluble calcium chloride, magnesium chloride, and magnesium sulfate; and the sparingly soluble calcium hydroxide, calcium sulfate, and magnesium hydroxide. As is known, the equilibrium states for the sparingly soluble compounds are such that their solubility is shifted so as to effect appreciable precipitation by the presence of additional common ions. Specifically, Equation 1 represents the equilibrium equation for calcium hydroxide, previously chosen to illustrate the problem:

where,

[Ca++] is the concentration of calcium ions,
[OH−] is the concentration of hydroxyl ions,
[Ca(OH)₂] is the concentration of undissolved or precipitated calcium hydroxide, and $$\frac{[Ca^{++}][OH^-]^2}{[Ca(OH)_2]} = K \quad (1)$$

K is the equilibrium constant for calcium hydroxide.

As can be seen from Equation 1, an increase in the concentration of calcium ions must be accompanied by an increase in the concentration of undissolved calcium hydroxide to maintain the ratio constant. Hence, contacting, by the lime-saturated filtrate, relatively higher concentrations, e.g., forty to sixty times as great in some instances, of calcium ions in the aqueous liquid in the subterranean formation shifts the solubility at the contact between the filtrate and the aqueous liquid such that calcium hydroxide is precipitated from the filtrate into the subterranean formation. By employing the method of the invention, such precipitation may be prevented.

In employing the method of the invention, any of the conventionally employed drill stem testing tools may be used to obtain a sample of the aqueous liquid from the productive subterranean formation. Further, any of the conventional and well-known methods of analysis, e.g., by chemical means or by electrochemical means employing electrodes and comparative cells, may be employed in determining the concentration of the alkaline earth metal ions of concern in the sample of the aqueous liquid.

Once the concentration of the alkaline earth metal ions of concern in the aqueous liquids has been determined, the cement slurry is made up employing, as the aqueous constituent thereof, water having a concentration of alkaline earth metal ions such that the concentration of the alkaline earth metal ions in the aqueous filtrate from the cement slurry is at least as great as the concentration of the alkaline earth metal ions in the aqueous liquid from the productive formation. Ensuring the desired concentration of alkaline earth metal ions in the filtrate is readily and easily achieved by mixing the cement slurry employing as its aqueous constituent a solution containing the alkaline earth metal ions in a concentration at least as great as the concentration of alkaline earth metal ions in the aqueous liquids from the productive formation. In this way, the presence of the alkaline earth metal ions in the cement slurry will form the precipitates in the slurry where they will be trapped and will not penetrate into the productive formation.

While the cation portion of the alkaline earth metal salt in the aqueous liquids from the productive formation is of greatest significance from the point of view of relative solubility, it is generally advantageous to employ a solution containing the same salt, both cation and anion, as was determined to be present in the aqueous liquid from the productive formation. The salts found in formation liquids are generally economical and stable salts such as calcium chloride, magnesium chloride, magnesium sulfate, and sodium chloride.

Including in the aqueous constituent of the cement slurry inorganic salts, other than the alkaline earth metal salts, which are present in the formation water can prevent other damage to the productive formation, e.g., clay swelling. In particular, the sodium chloride content of the aqueous constituent of the cement slurry should be as high as that of the aqueous liquid in the formation. It is particularly advantageous to employ the aqueous liquid from the productive formation as the aqueous constituent in mixing the cement slurry to ensure the desired concentrations of the alkaline earth metal salts, as well as the other inorganic salts, in the filtrate therefrom.

The following general guidelines are afforded to illustrate typical concentrations of alkaline earth metal salts which may be employed in the aqueous constituent of the cement slurry. The total concentration of the alkaline earth metal salts in the aqueous liquids in the productive formation will usually run no more than about 4 percent by weight. Infrequently, the concentration of the alkaline earth metal salts may run as high as 6 percent by weight or higher. Thus, the concentration of the alkaline earth metal salts in the filtrate from the cement slurry prepared in accordance with the method of the invention will be at least in the same range, for example, up to about 4 percent by weight and, infrequently, up to about 6 percent by weight. Calcium chloride is sometimes the only alkaline earth metal salt of concern in the aqueous liquid. Thus, a concentration of calcium chloride in the aqueous constituent of the cement slurry in the range of up to about 4 percent by weight and, infrequently, as high as 6 percent by weight, and as high as that in the aqueous liquid from the formation will suffice to prevent deposition of the precipitate in the formation. On the other hand, magnesium salts, such as magnesium chloride and magnesium sulfate, are rarely the only alkaline earth metal salts present in the aqueous liquid. Furthermore, when present, the magnesium salts are usually in a concentration of less than about 2 percent by weight. Thus, magnesium salts, e.g., magnesium chloride, magnesium sulfate, or both, are employed in a concentration in the range of up to about 2 percent by weight of the aqueous constituent of the cement slurry and as high as that in the aqueous liquids from the formation.

The inclusion of calcium chloride where it is the alkaline earth metal salt to be incorporated in the cement slurry may accelerate the setting of the cement slurry. Any of the conventional retarders such as the lignins, sodium lignosulfonate, calcium lignosulfonate, or the cellulose compounds such as carboxymethylhydroxyethylcellulose, may be employed to offset any undesired acceleration effects resulting from the inclusion of calcium chloride in the cement slurry. Where it is desired to employ a retarder, the amount conventionally employed to obtain the desired setting time may be used. This amount may run up to about 2 percent by weight of the cement slurry.

Conventional cementing equipment is employed in emplacing the cement slurry in the well between the casing and the wall of the well. By merely allowing the cement to set where placed, it will form a set cement bonding the casing to the wall of the well with a substantially impermeable sheath of set cement.

Having thus described the invention, it will be under- stood that such description has been given by way of illustration and example and not by way of limitation, reference for the latter purpose being had to the appended claims.

What is claimed is:

1. A method of cementing casing in a well penetrating subterranean formations including a productive subterranean formation containing aqueous liquids, which method comprises the steps of:
   (a) sampling said aqueous liquids in said productive formation, and determining the concentration therein of ions of at least one alkaline earth metal, which ions will form a precipitate in the formation when contacted by filtrate from a cement slurry prepared by using water free of said ions;
   (b) mixing an aqueous cement slurry such that the concentration of ions of said alkaline earth metal in the aqueous filtrate from said slurry is at least as great as the concentration of ions of said alkaline earth metal in said aqueous liquids; and
   (c) emplacing said cement slurry in said well between said casing and the wall of said well and allowing it to set, whereby a substantially impermeable sheath of set cement bonds said casing to the wall of said well.

2. The method of claim 1 wherein the ions of said at least one alkaline earth metal are calcium ions.

3. The method of claim 1 wherein the ions of said at least one alkaline earth metal are magnesium ions.

4. The method of claim 1 wherein the ions of said at least one alkaline earth metal are both calcium ions and magnesium ions.

5. The method of claim 1 wherein in said aqueous liquids of step (a) the concentration of at least one alkaline earth metal salt, consisting of said alkaline earth metal ions and anions, which will form a precipitate in the formation when contacted by filtrate from a cement slurry prepared by using water free of said salt is determined, and wherein said aqueous cement slurry of step (b) is mixed such that the concentration of said at least one alkaline earth metal salt in the aqueous filtrate from said slurry is at least as great as the concentration of said at least one alkaline earth metal salt in said aqueous liquids.

6. The method of claim 5 wherein said at least one alkaline earth metal salt comprises calcium chloride.

7. The method of claim 5 wherein said at least one alkaline earth metal salt is from the class consisting of magnesium chloride, magnesium sulfate, and mixtures thereof.

8. The method of claim 5 wherein said at least one alkaline earth metal salt comprises calcium chloride, magnesium chloride, and magnesium sulfate.

9. The method of claim 5 wherein in said aqueous liquids of said step (a) the concentrations of said at least one alkaline earth metal salt and of at least one other inorganic salt are determined, and wherein said cement slurry of said step (b) is mixed such that the concentrations of said at least one alkaline earth metal salt and of said at least one other inorganic salt in said aqueous filtrate from said slurry are at least as great as the concentrations of said at least one alkaline earth metal salt and said at least one other inorganic salt in said aqueous liquids.

10. The method of claim 9 wherein said at least one other inorganic salt is sodium chloride.

11. The method of claim 9 wherein said at least one alkaline earth metal salt comprises calcium chloride, magnesium chloride, and magnesium sulfate, and said at least one other inorganic salt comprises sodium chloride.

12. In a method of cementing casing in a well penetrating subterranean formations, including a productive subterranean formation containing aqueous liquids having known concentrations, each greater than zero, of calcium chloride, magnesium chloride, magnesium sulfate, and sodium chloride, by employing a cement slurry having a solids phase and an aqueous constituent, the improvement comprising employing as the aqueous constituent of said cement slurry an aqueous liquid containing therein concentrations of calcium chloride, of magnesium chloride, of magnesium sulfate, and of sodium chloride each at least as great as said known concentrations of said calcium chloride, said magnesium chloride, said magnesium sulfate, and said sodium chloride in said aqueous liquids in said productive subterranean formation.

13. The method of claim 12 wherein said aqueous constituent of said cement slurry is said aqueous liquids from said productive subterranean formation.

References Cited

UNITED STATES PATENTS

| | | | |
|---|---|---|---|
| 1,452,463 | 4/1923 | Huber | 166—29 |
| 2,191,652 | 2/1940 | Hamilton | 166—21 X |
| 2,649,160 | 8/1953 | Williams et al. | 166—29 |
| 2,868,295 | 1/1959 | Brooks et al. | 166—29 |
| 2,961,044 | 11/1960 | Shell | 166—21 |
| 3,064,957 | 11/1962 | Jacoby | 166—29 X |
| 3,114,418 | 12/1963 | Keyser | 166—29 |
| 3,340,929 | 9/1967 | Slagle | 166—29 |

OTHER REFERENCES

Condensed Chemical Dictionary. N.Y., Reinhold Pub. Corp., 6th Ed., 1961, p. 10009.

Oil-Well Cementing Practices in the United States, N.Y., American Petroleum Inst., 1959, pp. 34–37, 69–72, and 87–89.

CHARLES E. O'CONNELL, *Primary Examiner.*

I. A. CALVERT, *Assistant Examiner.*